No. 867,138. PATENTED SEPT. 24, 1907.
D. KAUKASIELI.
SILK WORM BREEDING DEVICE.
APPLICATION FILED APR. 17, 1907.
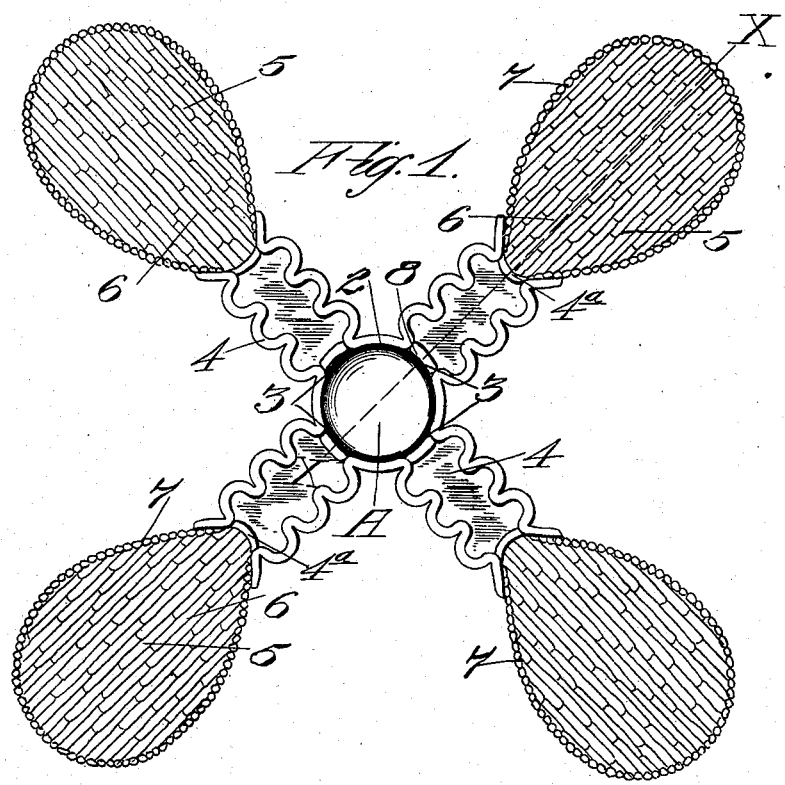
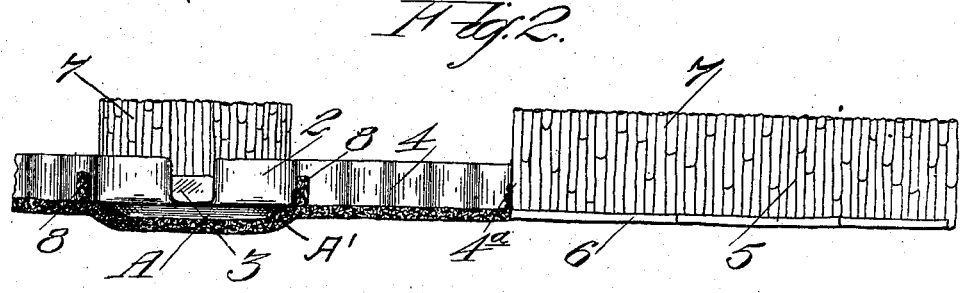
WITNESSES:
INVENTOR
BY
ATTORNEY

UNITED STATES PATENT OFFICE.

DATIKO KAUKASIELI, OF WEST BERKELEY, CALIFORNIA.

SILKWORM-BREEDING DEVICE.

No. 867,138.　　　　Specification of Letters Patent.　　　Patented Sept. 24, 1907.

Application filed April 17, 1907. Serial No. 368,788.

*To all whom it may concern:*

Be it known that I, DATIKO KAUKASIELI, a citizen of Russia, residing at West Berkeley, in the county of Alameda and State of California, have invented new and useful Improvements in Silkworm-Breeding Devices, of which the following is a specification.

My invention relates to an apparatus for the hatching and breeding of silk-worms.

It consists in a combination of parts and in details of construction which will be more fully explained by reference to the accompanying drawings, in which—

Figure 1 is a plan view of my silk-worm breeding device. Fig. 2 is a section on line $x$—$x$ of same.

In raising silk-worms from the time of hatching from the eggs, to a point where they are in readiness to form their cocoons, is critical, and in the ordinary methods many are lost before maturity.

It is the object of my invention to provide means by which a larger number are preserved and brought to a state of healthy maturity.

In my invention I form a sort of pen or receptacle A by a mixture of sheep and cow manure, which latter should be the dropping of comparatively old cows, or those which have had one or more calves, because this product is of a finer and more even texture and better fitted for the purpose. In furtherance of this result, it is also preferable that such material be a winter product instead of a summer one. The material being well mixed is formed into a sort of plate shape A with an approximately level center, and with the peripheral edges upturned at a slight angle as at A′. The central portion may be about twelve inches in diameter and the upwardly inclined edges, wide enough to make the whole diameter about 18 inches and around the outside is a vertical wall 2 sufficiently high to form an inclosure. This structure is molded from the paste, having a thickness approximately of ⅜ of an inch, and when set or hardened, is ready for use.

As many openings, 3, are made in the wall 2 as desired, and channels or pathways are made outwardly from these openings by means of sinuous walls 4 formed of the same material. These channels may be of suitable length as one yard or more, and terminate in inclosures 5 which are formed with floors 6 and walls 7, preferably made of corn-stalks laid parallel and closely together, and with the interstices calked or closed with suitable packing material.

Practical experience in this art has developed that a large percentage of the worms are lost after being hatched and I have discovered, that a change from the place where the worms are hatched to the place where they are matured, is a very great advantage in decreasing the mortality of the worms. This properly includes a very slight change of temperature; not enough to be noticeable, perhaps, in any case except for such delicate worms. The surface of the hatching portions is made of the material before described, and is substantially smooth. The floor of the feeding and maturing portions being made of cornstalks, is undulating, the convexity of the cornstalks and the intervening hollows or concavities providing the necessary undulations. The worms crawling over these undulations are caused to undergo a sort of muscular exercise which appears very beneficial to them. The surface of the floor necessitates the worms which move slowly over it to continually change the curvature of the body, and in feeding they will either raise the head, when lying in the hollows and feeding upon material which lies in the convexities, and which necessitates this change in the position of the head, or when lying upon or across the convexities of the surface they will feed with the head inclined downward. This has been found to be most advantageous for the proper preservation and maturing of the worms.

The operation and use will then be as follows: The eggs are placed on the floor or surface A, in such quantity as will allow room enough for the increased size of the worms after hatching, and these worms as they move around, will gradually spread out upon the inclined edges A′. They are sparingly fed while within this portion of the apparatus, being confined by temporary gates 8 of similar material placed across the outlets. When the worms are of sufficient size and strength the gates 8 are removed to allow the worms to pass into the channels or paths between the walls 4. The worms follow the sinuosities of these walls instinctively, and this constant curving of the body promotes their growth and strength. They are also sparingly fed at this stage of their progress, and when they reach the entrances 4ᵃ to the inclosures 5 they are allowed to enter, and are there fed and cared for until they are ready to begin the construction of the cocoons.

By the use of this or equivalent apparatus, silk-worms may be bred to maturity without being handled, or approached in any way detrimental to them.

Having thus described my invention, what I claim and desire to secure by Letters Patent is—

1. An apparatus for rearing silk-worms, said apparatus comprising hatching and maturing inclosures and a pathway leading from one inclosure to the other.

2. An apparatus for rearing silk-worms, said apparatus comprising a series of exterior inclosures, a central hatching inclosure and a series of pathways or channels connecting the inclosures, said hatching inclosure and pathways being composed of composite material.

3. An apparatus for rearing silk-worms, said apparatus including a preliminary hatching inclosure, sinuous pathways leading outwardly therefrom, and exterior feeding inclosures with which the outer ends of the channels connect.

4. An apparatus for rearing silk-worms, said apparatus including a central inclosure with upwardly inclined periphery and inclosing walls, channels or pathways having sinuous walls, and extending outwardly from the inclosure, other walled inclosures with which the outer ends of the channels connect, and gates to separate the different parts of the apparatus.

5. In an apparatus of the character described, an inclosure formed from the droppings of ruminating animals, and having an upwardly inclined rim, and an inclosing wall of the same material, pathways or channels with sinuous or serpentine walls and floor of similar material, exterior inclosures formed of corn-stalks, and gates by which access between the inclosures and pathway is controlled.

6. In an apparatus of the character described, a series of inclosures, including a hatching chamber, sinuous gate-controlled passages leading outwardly therefrom, and gate-controlled maturing chambers with which the outer ends of the passages connect.

In testimony whereof I have hereunto set my hand in presence of two subscribing witnesses.

DATIKO KAUKASIELI.

Witnesses:
S. H. NOURSE,
FREDERICK E. MAYNARD.